United States Patent

[11] 3,537,566

| [72] | Inventor | Maurice H. Bricker |
| | | Orchard Lake, Michigan |
| [21] | Appl. No. | 711,655 |
| [22] | Filed | March 8, 1968 |
| [45] | Patented | Nov. 3, 1970 |
| [73] | Assignee | Micromatic Hone Corporation |
| | | Detroit, Michigan |
| | | a corporation of Michigan |

[54] DEVICE FOR REORIENTING PARTS
11 Claims, 6 Drawing Figs.

[52] U.S. Cl. .................................................. 198/24,
198/31, 198/32, 198/33, 221/251
[51] Int. Cl. .................................................. B65g 47/24
[50] Field of Search.......................................... 198/31(A)2,
31, 32, 24, 33(R)2, 21; 214/8.5(F), 8.5(K), 8.5(A);
221/251, 247, 270; 53(Inquired)

[56] References Cited
UNITED STATES PATENTS
| 3,187,940 | 6/1965 | Harris............................ | 221/251X |
| 3,366,218 | 1/1968 | Kay................................ | 198/24 |

FOREIGN PATENTS
| 371,508 | 4/1932 | Great Britain................ | 221/25 |

Primary Examiner—Gerald M. Forlenza
Assistant Examiner—George F. Abraham
Attorney—Harness, Dickey and Pierce ABSTRACT: Semifinished gears roll in single file into aligned, open-ended carriers guided for parallel movement at right angles to their alignment. A pivotally supported arm above and directly coupled to the carriers, is swung to move the carriers from their aligned position to a stepped position, so that the gears are discharged along parallel paths, ending up in coaxial relation at a work station.

Patented Nov. 3, 1970

INVENTOR.
Maurice H. Bricher
BY Harness, Dickey & Pierce
ATTORNEYS.

Patented Nov. 3, 1970

INVENTOR.
Maurice H. Bricker
BY
Harness, Dickey & Pierce
ATTORNEYS 3,537,566

1

DEVICE FOR REORIENTING PARTS

BACKGROUND OF THE INVENTION

1. Field of the Invention

In cases where machining operations are to be performed, either on a number of coaxial parts at the same machine, or on a number of parts at different machines, the parts are conventionally fed to the machines in single file, and so must be reoriented, either to bring them into coaxial relation, or to distribute them to the different machines. The invention is for reorienting such parts in this manner.

2. Description of the Prior Art

A known device for this purpose, shown in Kay Pat. No. 3,366,218, has a plurality of slides connected by links to a swingable lever. Each slide has two workpiece carriers, one of which is spring-mounted, and individual stops are provided for the final stepped positions of the carriers.

This known device has several disadvantages compared to the present invention including the large number of parts required and the relatively complicated construction.

SUMMARY OF THE INVENTION

According to the invention the workpiece carriers are guided for parallel movement, transverse to the path of entry of the workpieces, but are coupled directly to a pivoted arm by means of rollers mounted on the carriers which extend into a slot in the underside of the arm. The latter is swingable between a first or receiving position aligned with the outlet of the workpiece entrance chute, and a second or delivery position in which the carriers are spaced successively greater distances from their starting position, proportional to their distance from the arm pivot. Until they reach their delivery position, the workpieces and their associated carriers block the workpieces behind them from rolling by gravity toward their discharge positions. However, as the arm reaches its delivery position, the workpieces (in this case gears) will pass the carriers blocking them and will roll down separate parallel paths into their final coaxial position.

The mounting plate on which the gears roll may be provided with additional fixed guides for use with spur gears which might otherwise not roll freely because of interference between the teeth of adjacent gears.

A stop mechanism for workpieces being fed into the device is also provided, in the form of a gate spring-urged toward a blocking position and retracted from this blocking position by return of the swinging arm from its delivery to its receiving position.

BRIEF DESCRIPTION OF THE DRAWINGS

FIG. 4 is a cross-sectional view in elevation taken along the line 4-4 of FIG. 1, and showing eight carriers together with the rollers directly coupling each carrier to the rocking arm;

DESCRIPTION OF THE PREFERRED EMBODIMENT

Figure 2:
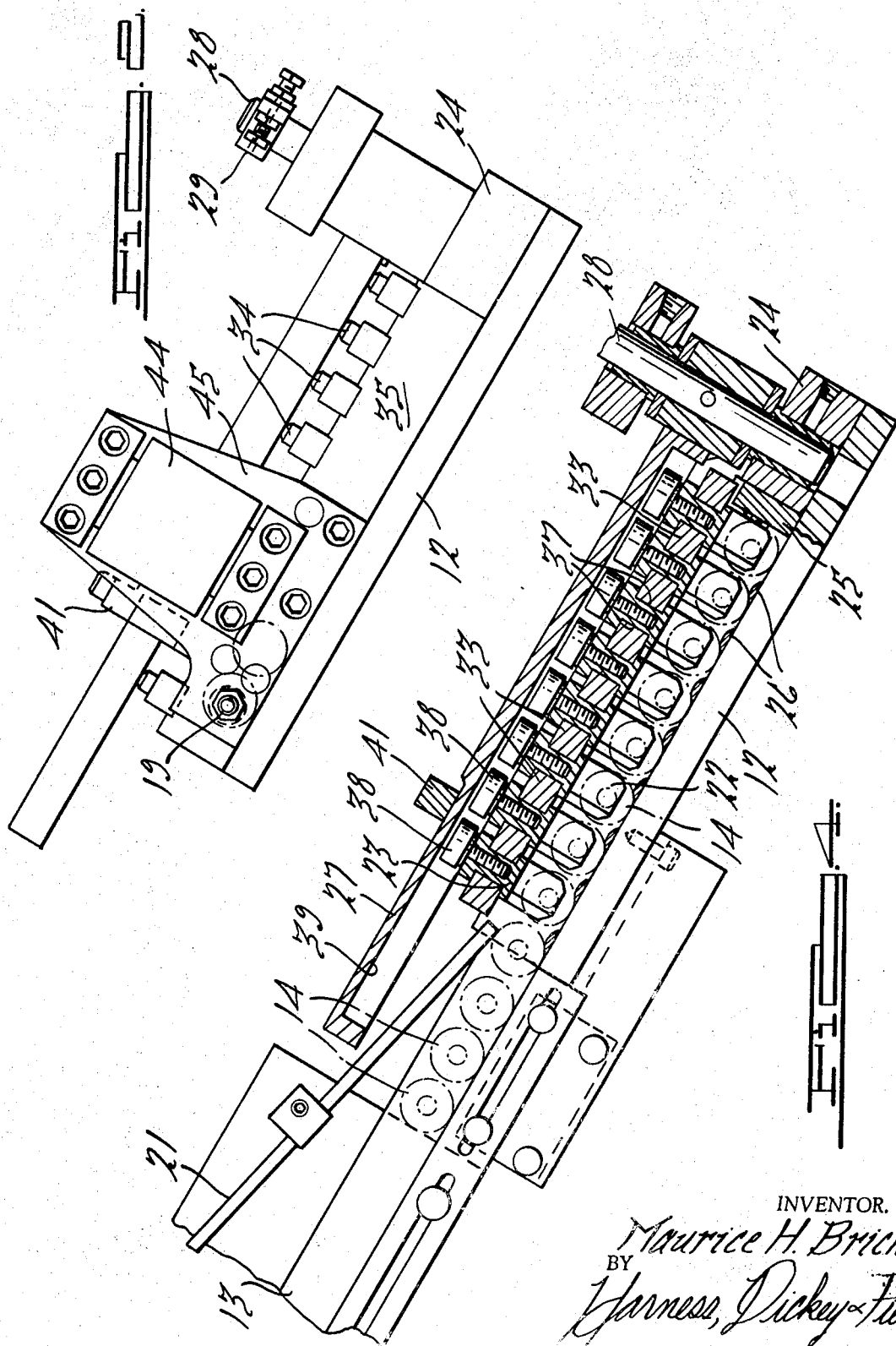
FIG. 2 is a side elevational view taken in the direction of the arrow 2 of FIG. 1, and showing the mounting means for the cylinder motor.

The device is generally indicated at 11 and comprises a flat rectangular mounting plate 12 which is inclined, as shown in FIGS. 2 and 4, at the same angle as an entrance chute 13,

2 which feeds workpieces 14 in single file. These workpieces may for example be semifinished gears with central holes which it is desired to hone in multiples of eight. It is therefore necessary to reorient the gears from single file into sets of eight coaxial gears, in position to receive the honing tool (not shown).

Figure 1:
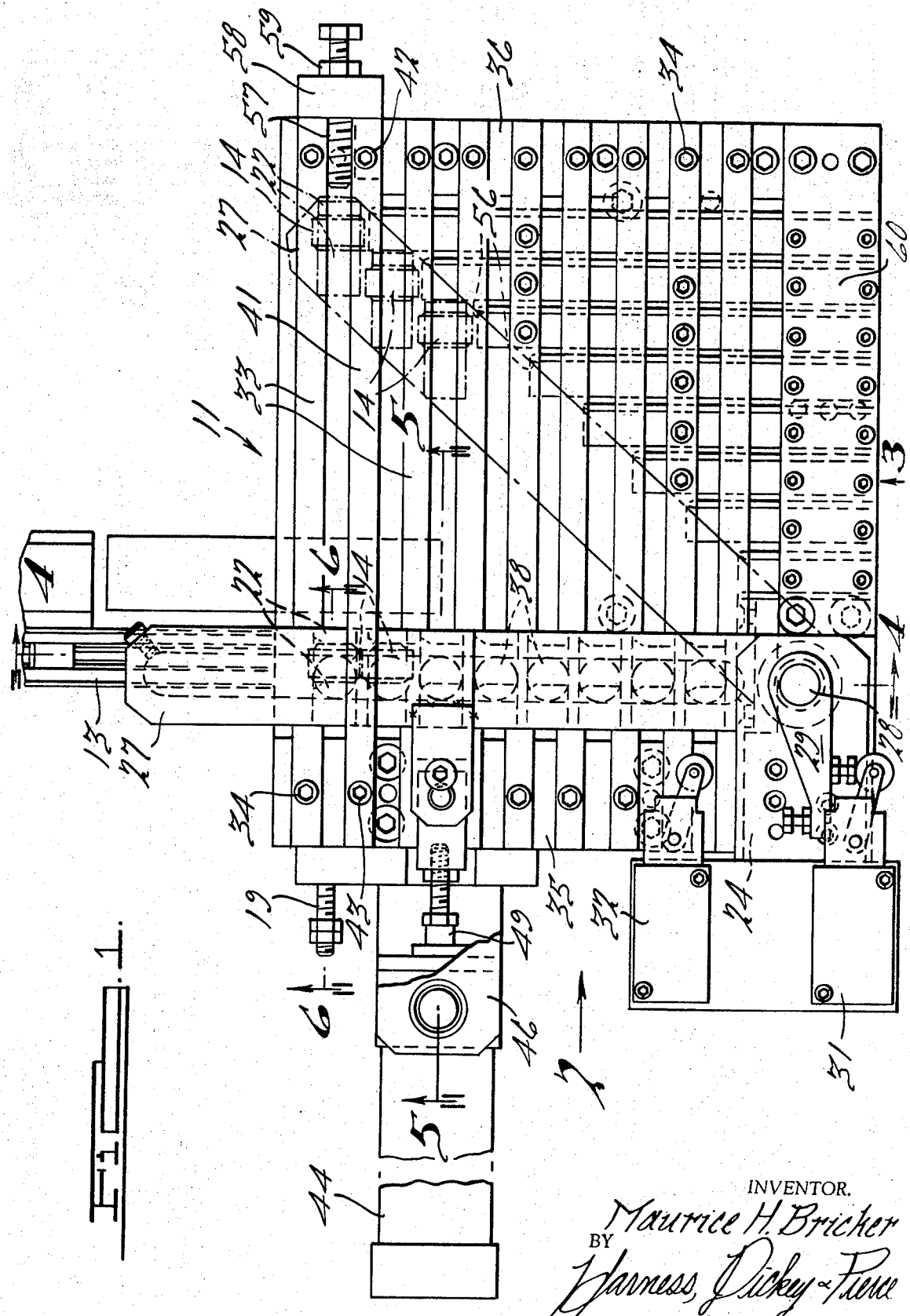
FIG. 1 is a top plan view of the device, parts being broken away, showing the arm in its receiving position.

An entrance gate 15 is mounted at the exit end of chute 13 which is at the upper left hand portion of plate 12, as seen in FIG. 1. The construction of this gate is seen best in FIG. 6, the gate comprising a plunger guided by a bushing 16 which in turn is carried by a support 17 secured to plate 12. Plunger 15 is urged by a spring 18 toward a position shown in dot-dash lines in FIG. 6, in which it blocks downward rolling of gears 14 from chute 13. Spring 18 surrounds extension 19 of plunger 15, a stop 20 on this extension limiting rightward movement of the gate in FIG. 6. The gate is retracted by means later described. A rod 21 is provided which controls a switch (not shown) indicating the presence of parts.

Figure 3:
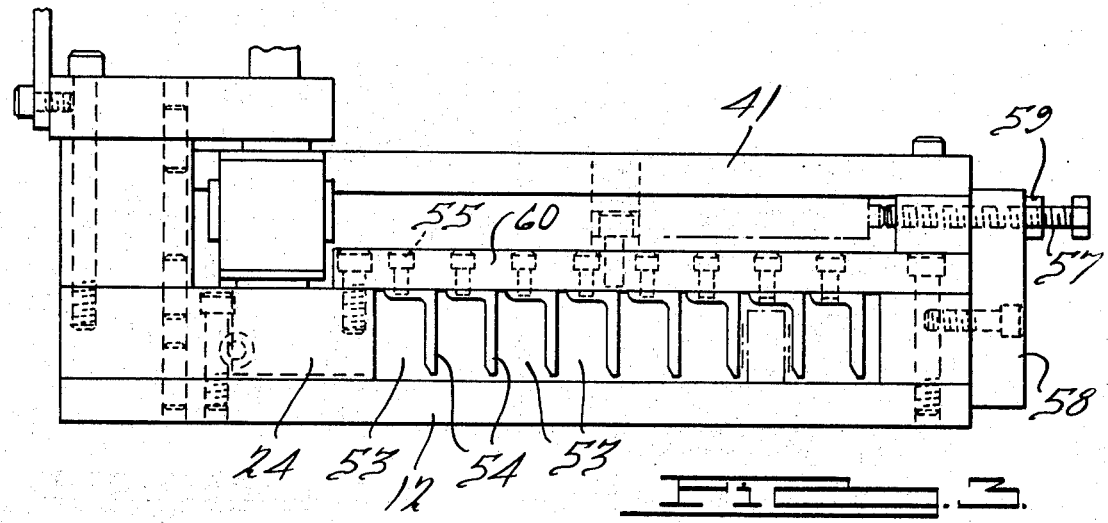
FIG. 3 is a front end elevational view taken in the direction of the arrow 3 in FIG. 1 and showing the discharge chutes.
Figure 6:
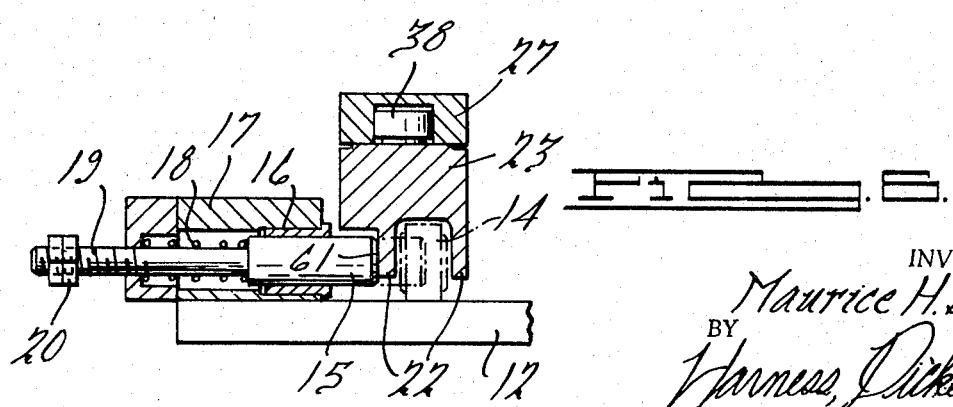
FIG. 6 is a fragmentary cross-sectional view in elevation taken along the line 6-6 of FIG. 1 and showing the manner in which the entrance gate is controlled by the position of the pivoted arm.

When gate 15 is retracted the gears will roll down plate 12 and enter a series of carriers 22. Each carrier comprises two arms which extend downwardly from an upper portion 23, as best seen in FIG. 6. The spacing between the arms of carrier 22 is slightly greater than the width of workpieces 14, and the width of carrier 22 (in the rolling direction of gears 14) is somewhat less than the diameter of the gears, as best seen in FIGS. 1 and 4. The edges of the carrier arms which face the entering gears are flared to facilitate their entrance. A member 24 is secured to the lower left hand portion of plate 12, as seen in FIGS. 1 and 3, and a stop 25 is mounted on the side of this member which faces the entering gears. The arrangement is such that eight gears entering from chute 13 will arrive at positions as shown in FIG. 4, disposed within the eight carriers 22 which are provided, with the lowermost gear engaging stop 25. For instance, where spur gears are being handled, rounded separating strips 26 may be secured to bed 12, these strips extending transversely to the entrance path of the gears, and maintaining the gears in slightly separated condition for their transverse movement, later described.

An arm 27 extends above carriers 22 parallel to base 12. This arm is supported on plate 12 by means of a pivot pin 28 mounted in member 24, as shown in FIG. 4. A limit switch actuating arm 29 is secured to the upper portion of pin 28 and is adapted to actuate a pair of limit switches 31 and 32 as seen in FIG. 1. Limit switch 31 defines the receiving position of arm 27, while switch 32 defines the discharge position, as will later be described.

Carriers 22 travel simultaneously from their receiving positions, seen in FIGS. 1 and 4, to their discharge positions in parallel paths of progressively increasing length, proportional to their distance from pivot pin 28. A plurality of guides 33 are provided for this purpose. These guides are of rectangular cross-sectional shape as seen in FIG. 4 and extend in parallel relation above bed 12, being secured at their opposite ends by fasteners 34 to anchors 35 and 36 at the right and left hands ends respectively of plate 12, as seen in FIG. 1. Notches 37, indicated in FIG. 4, are provided on opposite sides of each carrier portion 23 for receiving guides 33, so that the carriers are suspended above plate 12.

Each carrier portion 23 is directly coupled to arm 27 by a roller 38 which is received by a continuous slot 39 in the underside of arm 27, as seen in FIG. 4. A hold down rail 41 for arm 27 extends the entire width of plate 12, as seen in FIG. 1, being secured at its opposite ends by fasteners 42 and 43.

Figure 5:
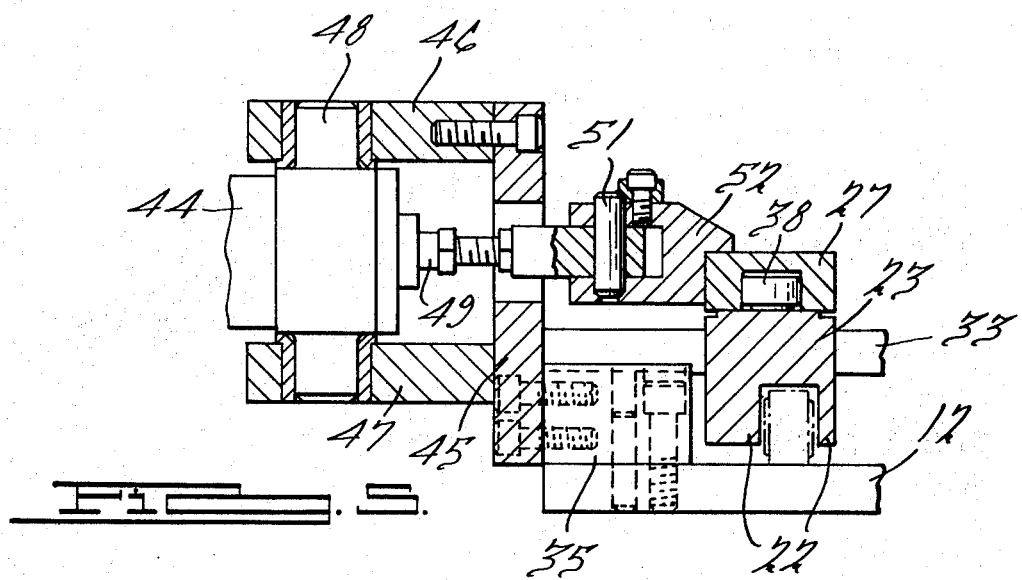
FIG. 5 is a fragmentary cross-sectional view taken along the line 5-5 of FIG. 1 and showing a connection between the cylinder motor and the arm as well as the manner in which a carrier retains a workpiece.

The length of arm 27 is such that when it, together with carriers 22, is in its receiving position, as shown in FIG. 4, aligned with the outlet of entrance chute 13, rollers 38 will occupy only a portion of slot 39. A cylinder motor 44 is provided for moving arm 27 to its discharge position as shown in dot-dash lines in FIG. 1. This motor is mounted on a bracket 45 secured to the outside of anchor 35, as seen in FIG. 2, the bracket having a pair of spaced arms 46 and 47 which retain a trunnion support 48 for the cylinder, seen in FIG. 5. A piston rod 49 extends from cylinder 44 and is connected by a pivot pin 51 to a forked extension 52 secured to lever 27. When piston rod 49 is retracted, arm 27 will be in its receiving position, but when the piston rod is extended, the arm will be swung to a discharge position as seen in dot-dash lines in FIG. 1.

A plurality of discharge chutes 53 are provided, extending at right angles or transversely to guides 33. These chutes are formed by eight bars 54 of inverted L-shaped cross section, (FIG. 3), the bars being of progressively greater length in proportion to their distance from pivot 28, as seen in FIG. 1. The horizontal portions of bars 54 are secured to the undersides of bars 33 by fasteners 55, and the vertical portions of the bars are on the right hand sides of the chutes. The entrance ends 56 of bars 54 are preferably tapered, as seen in FIG. 1, and the spacing of chutes 53 corresponds to the staggered positions which gears 14 are in when they complete movement from their receiving to their discharge positions.

An adjustable stop 57 is provided for the discharge position of lever 27, as seen in FIGS. 1 and 3, the stop comprising a screw carried by a bracket 58 and securable in its adjusted position by a lock nut 59. The lower or exit ends of chutes 53 are aligned and covered by a plate 60, as seen in FIGS. 1 and 3.

The outermost carrier 22 is notched, as indicated at 61 in FIG. 6, and engageable with the outer end of gate 15 when the parts reach their receiving position. As seen in FIG. 6, gate 15 will thus be retracted to permit a new set of eight gears to enter the carriers.

In operation, starting from the position shown in FIGS. 1 and 4 with the parts in their receiving position and eight gears retained by the carriers, extension of piston rod 49 will swing arm 27 about pivot 28. As arm 27 leaves its receiving position, gate 15 will follow carrier 23 shown in FIG. 6 and will thus block further feeding of gears 14 from chute 13. Carriers 22 will travel between guides 33, rollers 38 remaining within slot 39 of arm 27. The velocities of the carriers will be proportional to their distance from pivot 28, and the gears will assume a staggered relation. When arm 27 reaches the dot-dash position in FIG. 1, each gear will have cleared the gear in front of it as well as the carrier for that gear.

If helical gears are being handled, and spacers 26 are not present, each gear will rest on the one in front of it until it clears that gear and then will tend to roll forward. At this point the gears will be moving at their maximum velocity and will have practically reached positions in front of their respective chutes 53. Any downward rolling movement before they reach the discharge position will thus be insufficient to engage the carrier 22 in front of them. The gears will all roll down their respective chutes 53 and will be discharged to a fixture (not shown) or other appropriate mechanism. Arm 27 will then be returned by retraction of piston rod 49 to its receiving position. As arm 27 reaches its receiving position, the outermost carrier 23, seen in FIG. 6, will reengage gate 15, retracting the gate to permit an additional eight gears to enter the carriers. The cycle may then be repeated.

Limit switches 31 and 32 are provided to control the operation of cylinder motor 44 by a conventional valving arrangement (not shown).

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

I claim:

1. A device for reorienting parts, including an inclined mounting plate, a plurality of workpiece carriers, means mounting said carriers for reciprocation above said plate along parallel paths, said carriers having open ends, a single file workpiece entrance chute discharging at the upper end of said plate, an arm above said carriers and parallel to said plate, means pivoting one end of said arm to said plate, interfitting means on said carriers and arm coupling said carriers to said arm with said carriers directly below said arm at all times, means for moving said arm between an initial receiving position in which said carriers and arm are aligned with said entrance chute, transverse to said parallel paths, whereby the open carrier ends will permit entry of workpieces into said carriers, and a discharge position in which said carriers and their retained workpieces are spaced successively greater distances from their initial position, the distance traveled by each carrier from its receiving to its discharge position being proportional to its distance from the pivot of said arm, and chutes aligned with the open ends of said carriers when in their discharge positions, whereby workpieces retained by said carriers will pass therefrom into said discharge chutes.

2. The combination according to claim 1, said carrier mounting means comprising a plurality of guides secured in spaced parallel relation above said plate, said carriers being disposed between and suspended by said guides.

3. The combination according to claim 2, said discharge chutes being formed by inverted L-shaped members of lengths which increase progressively in proportion to their distance from the arm pivot, the horizontal portions of said L-shaped members being secured to the undersides of said guides, the vertical portions thereof being on the sides of said discharge chutes remote from said arm pivot.

4. The combination according to claim 3, the entrance ends of said L-shaped members being tapered to facilitate entry of the workpieces being discharged.

5. The combination according to claim 2, further provided with rounded spacers secured in spaced relation to said plate between said carriers and extending parallel to said guides, whereby circular workpieces will be maintained in slightly spaced relation when in their receiving position.

6. The combination according to claim 2, said arm when in its receiving position being at right angles to the extent of said guides.

7. The combination according to claim 1, further provided with an entrance gate mounted on said plate and movable to and from a position blocking entry of workpieces from said entrance chute into said carriers, and means carried by said arm engageable with said gate to retract the gate when the arm reaches its receiving position.

8. The combination according to claim 1, said interfitting means for coupling said carriers to said arm comprising rollers on said carriers disposed within a slot on the underside of said arm.

9. The combination according to claim 1, said arm moving means comprising a cylinder motor mounted on a bracket extending upwardly from said plate, and a pivotal connection between the piston of said cylinder motor and said arm.

10. The combination according to claim 1, the width of said carriers being less than the diameter of the workpieces being handled thereby, the entrances of the open ends of said carriers being flared to facilitate reception of said workpieces.

11. The combination according to claim 1, further provided with rounded spacers secured in spaced parallel relation on said plate to maintain workpieces received by said carriers in slightly spaced relation.